US005647949A

United States Patent [19]

Kepert

[11] Patent Number: 5,647,949

[45] Date of Patent: Jul. 15, 1997

[54] FOLDER FOR WEB-FED PRINTING PRESSES

[75] Inventor: Manfred Kepert, Grosskarlbach, Germany

[73] Assignee: Albert-Frankenthal Aktiengesellschaft, Frankenthal, Germany

[21] Appl. No.: 379,564

[22] PCT Filed: Aug. 11, 1993

[86] PCT No.: PCT/DE93/00718

§ 371 Date: Feb. 13, 1995

§ 102(e) Date: Feb. 13, 1995

[87] PCT Pub. No.: WO94/04363

PCT Pub. Date: Mar. 3, 1994

[30] Foreign Application Priority Data

| | | | |
|---|---|---|---|
| Aug. 11, 1992 | [DE] | Germany | 43 26 855.2 |
| Aug. 13, 1992 | [DE] | Germany | 42 26 792.7 |

[51] Int. Cl.$^{6}$ .......... B32B 31/00

[52] U.S. Cl. .......... 156/578; 156/384; 156/461; 493/321

[58] Field of Search .......... 156/200, 227, 156/384, 461, 578; 493/321, 436, 439

[56] References Cited

U.S. PATENT DOCUMENTS

| | | | |
|---|---|---|---|
| 2,236,229 | 3/1941 | Worthington | 493/321 X |
| 4,708,300 | 11/1987 | Goetz | 242/58.1 |

FOREIGN PATENT DOCUMENTS

| | | |
|---|---|---|
| 0096832 | 9/1986 | European Pat. Off. . |
| 474861 | 3/1929 | Germany . |
| 1189562 | 11/1965 | Germany . |
| 3527660 | 2/1987 | Germany . |

*Primary Examiner*—James Engel

*Attorney, Agent, or Firm*—Jones, Tullar & Cooper

[57] ABSTRACT

In a folding apparatus for web-fed rotary printing presses with linear folding units, transverse folding units and a cylinder part it is intended to selectively produce transversely stapled as well as transversely glued products. A receiving unit for interchangeable transverse gluing devices and continuous transverse stapling devices is disposed below the linear folding units and above the cylinder part.

5 Claims, 4 Drawing Sheets

FOLDER FOR WEB-FED PRINTING PRESSES

FIELD OF THE INVENTION

The invention relates to a folding apparatus for web-fed rotary printing presses. The present invention is directed to a folder having interchangeable cross gluing and ribbon stapling devices. The convertible folder utilizes a receiving unit or work station which is situated intermediate longitudinal and cross folding devices. The receiving unit can accommodate both cross gluing devices and ribbon stapling devices. Provision is made in the receiving unit to facilitate the expeditious installation or removal of a cross gluing device or a ribbon stapling device in either one of two mounting locations in the receiving unit.

DESCRIPTION OF THE PRIOR ART

It is known to install transverse gluing devices in folding apparatus to provide a continuous paper web with a transverse application of glue and then to bring this paper web together with a further paper web and to glue these two together in this way.

A transverse gluing device of this type is shown in EP 0 096 832 B1, wherein glue from a reservoir is provided axially to an application cylinder and is passed to the paper web once or twice during each revolution of the cylinder by means of coaxially extending application strips. The employment of such transverse gluing devices is of particular advantage when eight- or twelve-page DIN A4 products are produced which can be stacked in increased amounts.

It is furthermore known to employ so-called continuous stapling machines in folding apparatus of web-fed rotary printing presses for transverse stapling of signatures of more the twelve pages in DIN A4 format. In the course of this, a reduced stackability of the stapled products must be accepted in comparison with transversely glued products because of the presence of staples in the crease of the fold. A continuous stapling machine of this type is known from DE-PS 11 89 562.

However, in connection with the state of the art it is disadvantageous that, because of the fixed installation of either a transverse gluing device or a continuous stapling machine (transverse stapler) in a folding apparatus between the linear folding device and the transverse folding apparatus, either transversely-glued or transversely stapled products were possible.

SUMMARY OF THE INVENTION

It is the object of the present invention to provide a folding apparatus with a device for the transverse connection of a plurality of strips of paper webs guided on top of each other and a transverse folding machine downstream thereof, by means of which it is possible to further increase the variety in the production of folded products by means of this folding apparatus in addition to the known options of producing linearly or transversely folded products whose pages are connected with each other.

As will be discussed in detail in the description of the preferred embodiment which is set forth subsequently, the folder for web-fed printing presses in accordance with the present invention utilizes spaced longitudinal and cross folding devices to fold and assembly printed products. A receiving unit or work station is positioned intermediate the longitudinal and cross folding devices. This receiving unit is able to support two web or web segment joining devices in two mounting locations. These web joining devices may be two cross-gluing devices, two ribbon stapling devices, or one of each. These web or ribbon joining devices are interchangeable in the receiving unit by use of a travelling crane and suitable support tracks. Each such joining device is quickly connectable to a drive means and to the required electric, pneumatic, hydraulic or other lines by suitable quick connect couplings.

The advantages which can be achieved by means of the invention consist particularly in that the above mentioned disadvantages in the state of the art are avoided. Furthermore, by means of a folding apparatus it is possible to produce folded products which are either only transversely glued, or only transversely stapled, or transversely stapled on the outside with transversely glued inserts, or which are only linearly and transversely folded or only transversely folded. These folding products can have more than twelve pages in DIN A4 format which would be necessary per "four page drop".

Up to now it was necessary to decide prior to buying a web-fed rotary printing press whether the folding apparatus should be equipped with transverse gluing or continuous stapling devices. It is no longer necessary to make this decision so early. By means of the freely selectable employment of transverse gluing or continuous stapling devices in the same folding apparatus it is made possible when, for example, two transverse gluing units are used, to glue 8- and 12-page DIN A4 products together along the transverse fold line, or to staple 8, 12 and, following that, DIN A4 products of more pages along the transverse fold line. Transverse gluing permits a better stacking with 8- or 12-page products, which makes further processing outside of the folding apparatus easier. When producing products of more than 12 pages, however, it is better to employ continuous stapling devices and to avoid additional transverse gluing units in this way.

By means of the folding apparatus in accordance with the invention it is possible to produce transversely glued as well as transversely stapled products, which is advantageous for a large production variety. In this way it is possible, when using two devices simultaneously and with the presence of two transverse gluing and two continuous stapling devices, to perform different variants of the production of printed products, among others it is possible to transversely staple products of 24 pages in DIN A4 format from a linearly cut paper web of whole width or half-width and to transversely glue 8 pages in DIN A4 format from a half-width paper web.

It is therefore possible in an advantageous manner to design the transverse gluing and transverse stapling devices in the form of modules, which can be easily exchanged and combined with each other, for transversely connecting strips of linearly cut paper webs to form paper trains.

BRIEF DESCRIPTION OF THE DRAWINGS

Exemplary embodiments of the invention are represented in the drawings and will be described in more detail in what follows. Shown are in.

DESCRIPTION OF THE PREFERRED EMBODIMENT

Figure 1:
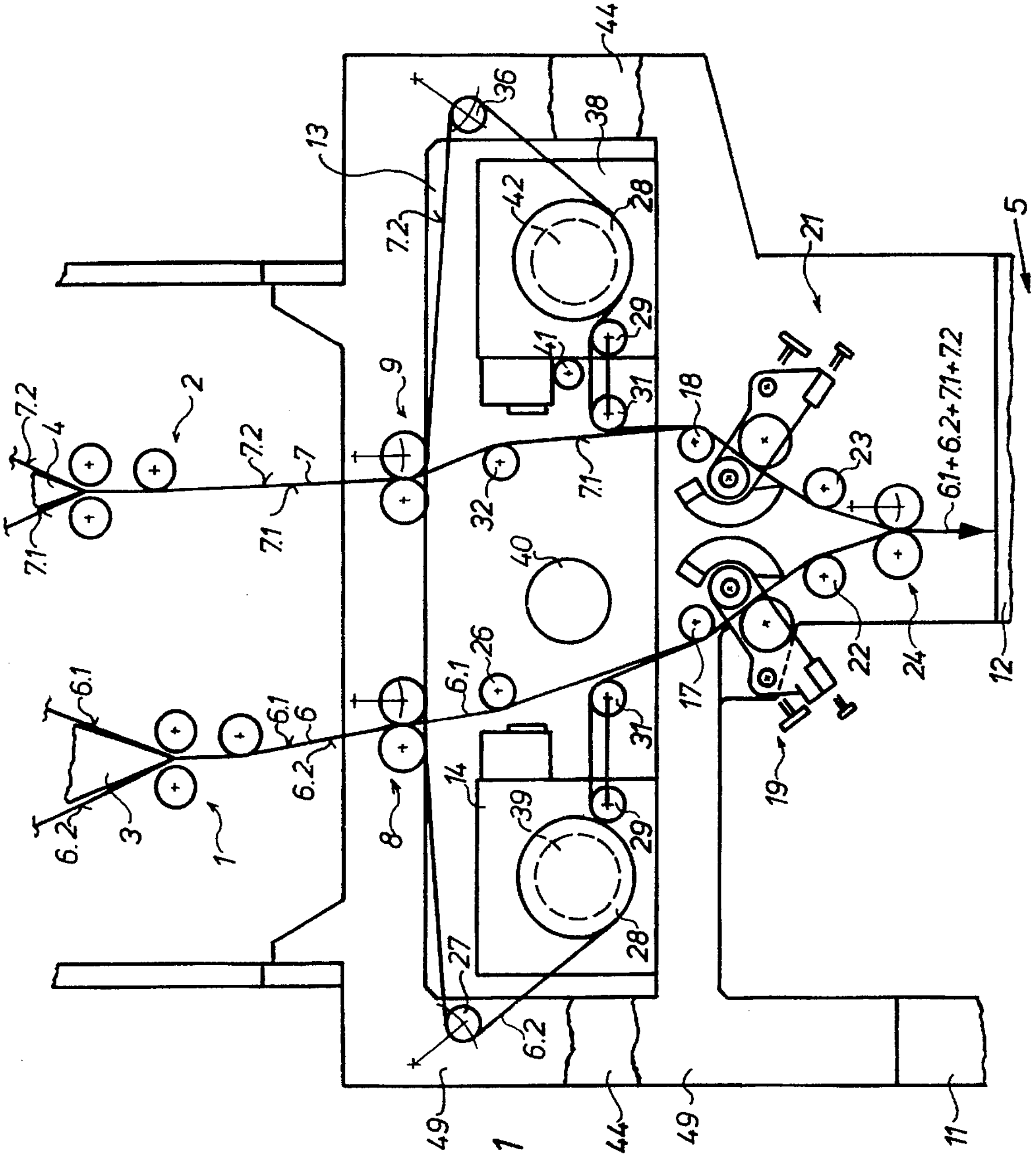
FIG. 1, a folding apparatus in accordance with the invention with two interchangeable transverse gluing devices in a work station and without a lifting device, console or wire feed, FIG. 2, the folding apparatus in accordance with the invention with two interchangeable continuous stapling devices in the work station and without the lifting device, console or wire feed, FIG. 3, the folding apparatus in accordance with the invention with an interchangeable transverse gluing device and an interchangeable continuous stapler in the work station and without the lifting device, console and wire feed, FIG. 4, a lateral view of the work station in FIG. 2, FIG. 5, the enlarged representation of the details X and Y of FIG. 2.
Figure 2:
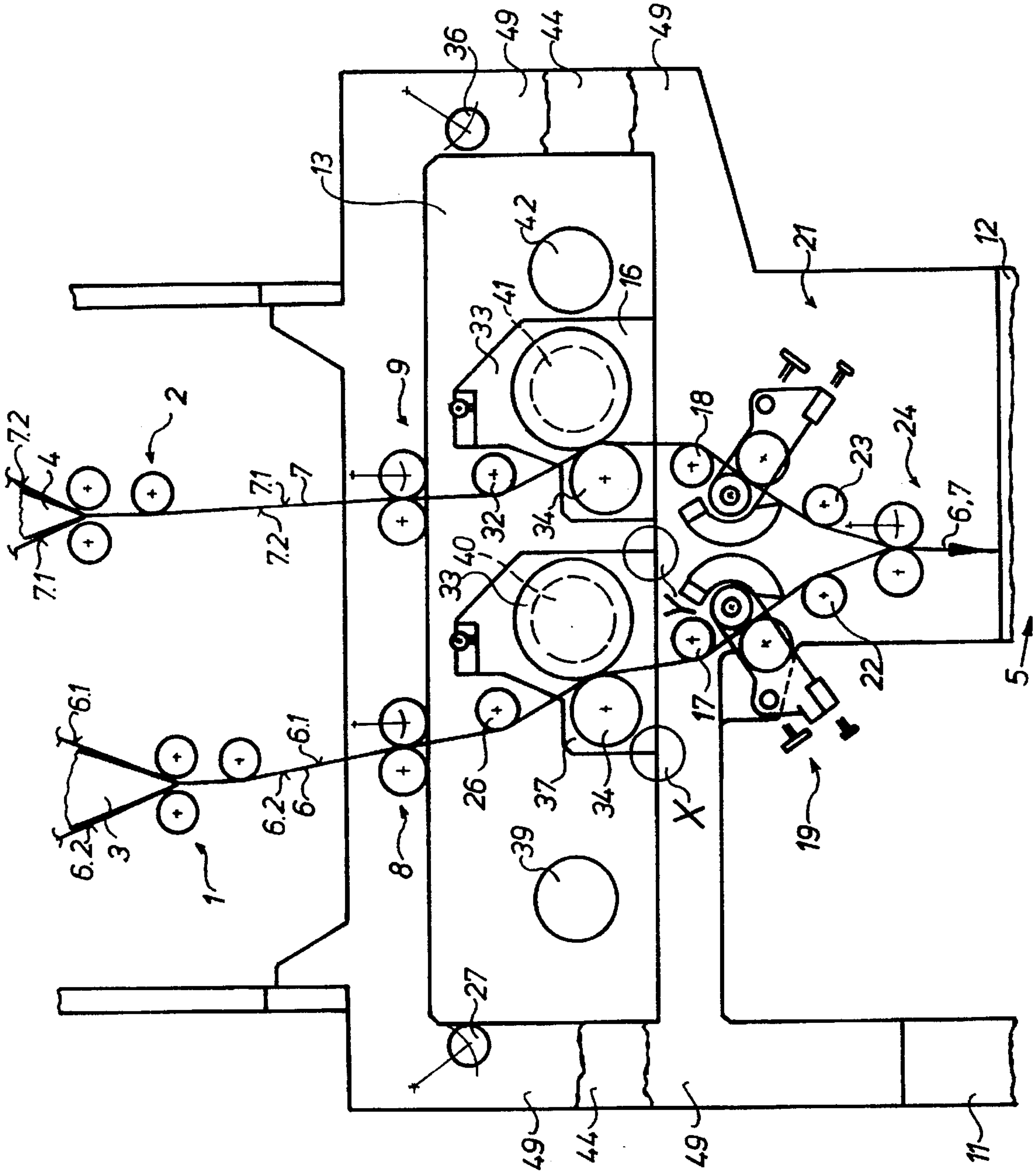
Figure 3:
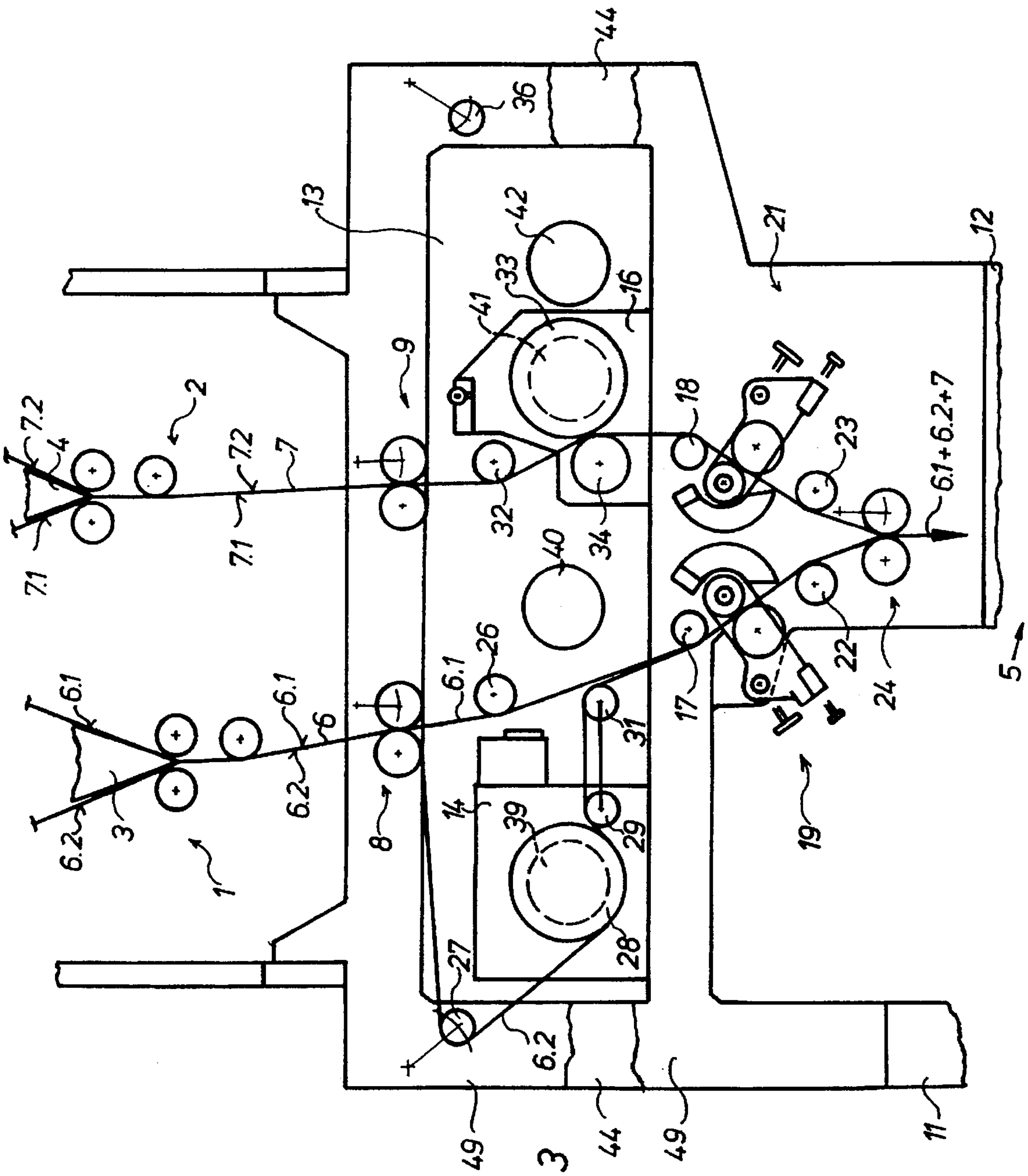

As also illustrated in FIGS. 1 to 3, two linear folding devices 1; 2 with respectively one former 3; 4 each are disposed fixed on the folding apparatus frame. Partial paper webs such as strips 6.1; 6.2; 7.1; 7.2 are fed in a known manner to the formers 3; 4 as individual paper web strips or as paper web trains 6 and 7, each such train 6 or 7 consisting of a plurality of paper strips placed on top of each other. In the process the paper web strips 6.1.; 6.2; 7.1; 7.2 or the paper web train formed from them run through the formers 3; 4 and are linearly folded, or they pass along respectively both or one of the lateral former cheeks of the formers 3; 4 without being linearly folded into driven pairs of drawing rollers 8 or 9.

Viewed in the paper web strip travel direction, a work station 13 for operating a plurality of freely interchangeable transverse gluing devices, such as 14; 38 and/or transverse stapling devices continuous stapling devices 16, 39 is installed between the drawing rollers 8 or 9 and a folding device 5, not shown.

As further represented in FIG. 1, the left paper train 6 consists of two or more paper web strips 6.1, 6.2, etc. The paper web strips 6.1, 6.2—hereinafter called strips 6.1, 6.2 for short—have been created by cutting a full-width or a half-width paper web in the linear direction prior to entering the formers 3 to 4. The strips 6.1; 6.2 etc. of the paper train 6, which were first guided jointly and placed on top of each other, are separated again after leaving the left pair of drawing rollers 8 and are individually passed on. The left strip 6.2 runs via a "detour" over an adjustable regulating roller 27 by means of which the linear register of the left strip 6.2 can be set -, over an application cylinder 28 for glue, known per se (EP 0 096 832 B1), a left transverse gluing device 14, wherein the circumferential speed of the application cylinder 28 and the web speed of the strip are equal. After the glue application has been provided on the application cylinder 28, the strip 6.2 continues over the guide rollers 29; 31 to a further guide roller 17. Uniting takes place there, i.e. the left strip 6.2 is placed on top of the right strip 6.1 and they are pressed together, and both strips 6.1; 6.2 are connected with each other in a transversely glued manner by means of the transverse application of glue on the side of the strip 6.2 facing the strip 6.1. After its passage through the first drawing rollers 8, the right strip 6.1 runs without a detour over the guide rollers 26, 17 and 22 into the second driven drawing rollers 24. A linear cutting device 19 can be disposed on the path between the guide rollers 17 and 22.

A glue application cylinder of a further transverse gluing device can be provided in place of the guide roller 26.

The right paper train 7 (see FIG. 1), consists of two or more paper strips 7.1, 7.2, etc. The partial paper webs 7.1, 7.2—hereinafter called strips 7.1, 7.2 for short—have been created by cutting a full- or half-width paper web in the linear direction prior to entering the formers 3 to 4. The strips 7.1; 7.2, etc. of the paper train 7 which are guided together are separated again after leaving the right drawing roller pair 9 and continue separately. The right strip 7.2 passes over an adjustable regulating roller 36 by means of which the linear register of the right strip 7.2 can be set -, over an application cylinder 28 for glue, known per se (EP 0 096 832 B1), a right transverse gluing device 38, wherein the circumferential speed of the application cylinder 28 and the web speed of the strip are equal. After the glue application has been provided on the application cylinder 28, the strip 7.2 continues over the guide rollers 29; 31 to a further guide roller 18. Uniting and pressing together of the left 7.1 strip with the right strip 7.2 takes place there, and in this way both strips 7.1; 7.2 are connected with each other in a transversely glued manner by means of the transverse application of glue on the side of the strip 7.2 facing the strip 7.1. After its passage through the drawing rollers 9, the left strip 7.1 runs without a detour over the guide rollers 32, 18 and 23 into driven drawing rollers 24. A linear cutting device 21 can be disposed on the path between the guide rollers 18 and 23.

A glue application cylinder of a second transverse gluing device can be provided in place of the guide roller 32.

As also shown in FIG. 2, left, 14, and right transverse gluing devices 38 (FIG. 1) can be interchanged for continuous transverse stapling devices 37 or 16, known per se (DE-PS 11 89 562). As known, a stapling wire feed 60, a stapling cylinder 33 for the forming of open staples which are pressed through the paper trains 6 and 7, and respectively one closing cylinder 34 for closing the staples are provided for each continuous stapling device.

The arrangement of the driven drawing rollers 8; 9; 24, of the guide rollers 26; 39; 17; 32, 42, 18, 23, is the same as is used for the arrangement of the plurality of transverse gluing devices 14; 38, in the same way the receiving unit 13 is the same. In the work station 13 the following devices can be exchangeably disposed, for example:

a. one or several transverse gluing devices 14; 38 (FIG. 1);
b. two continuous transverse stapling devices 37; 16 (FIG. 2);
c. on the left, one or several transverse gluing devices 14, on the right a continuous transverse stapling device 16 (FIG. 3);
d. on the left a continuous transverse stapling device 37, on the right one or several transverse gluing devices 38;
e. on the left or the right respectively one transverse gluing device 14; 38;
f. on the left or the right respectively one continuous transverse stapling device 16; 37;
g. neither a transverse gluing device nor a continuous transverse stapling device;
h. linearly folded or not linearly folded paper webs.

In this case, for example, the width of the paper train 6 and of the paper train 7 can have half the maximum web width and can consist of several paper web strips. By means of driven pairs of drawing rollers 8; 9, the paper trains 6; 7, which were linearly folded by means of the formers 3; 4, traverse the work station 13 which is connected with the side frames 11; 12. It is used for the temporary connection with the temporary operation of a plurality of transverse gluing device 14, known per se, or continuous transverse stapling device 16, known per se, for creating a transverse fold.

When the paper trains 6; 7 of the strips 6.1; 6.2; 7.1; 7.2 have left the work station 13, they run together over guide rollers 22; 23 and a linear cutting device 19; 21, which can be switched on and off, into a lower driven pair of drawing rollers 24. From there, the combined, dual-layer paper train 6 plus 7; 6.1 plus 6.2 plus 7.1 plus 7.2 reaches via transverse and linear perforating devices, known, per se, a further pair of drawing rollers, finally a gap between a cutting cylinder and a, for example, five-field collection and folding blade cylinder and is cut there transversely into signatures. The signatures are taken up by the collection and folding blade cylinder and are subsequently transversely folded into signatures by the cooperation of folding blades of the collection and folding blade cylinder with controlled folding jaws of the folding jaw cylinder.

After the combined paper trains 6; 7 or the combined strips 6.1; 6.2; 7.1; 72 have run through the drawing rollers 24, they come to a cutting and transverse folding device 12, for example, such as is known from DE 36 26 287 C2, for example, but without so-called second linear folding devices. The trains 6; 7; 6+7; 6.1+6.2+7.1+7.2 or other combinations come between a cutting blade cylinder and a five-field folding blade and collection cylinder, for example, with a corresponding number of counter cutting strips and are continuously transversely cut into signatures there. The signatures can remain selectively collected or uncollected on the folding blade and collection cylinder and are subsequently transported in controlled folding jaws of a, for example, five-field folding jaw cylinder with the corresponding number of folding jaws, folded and passed on to a conveyor belt system, for example. The conveyor belt system selectively transports the transversely folded signatures, which are in the form of folded products and transferred to it by the folding jaw cylinder, selectively in one or two paddle wheel outputs.

Figure 4:
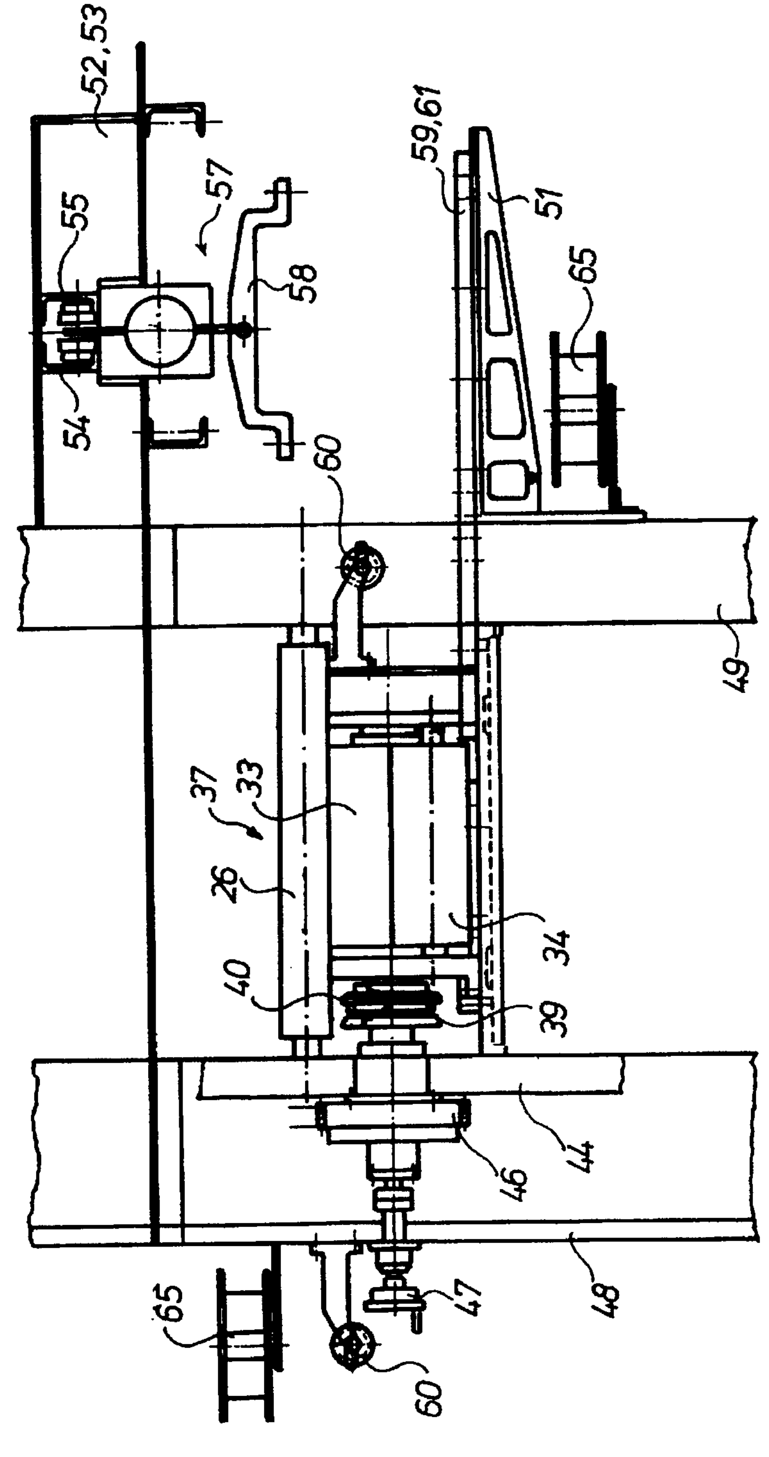

A stationary quick coupling 39 to 42, as seen in FIG. 4, is provided for the mechanical drive of each one of the interchangeable transverse gluing and continuous transverse stapling devices 14; 38 and 16; 37. For example, the two quick couplings 39; 42 are used for connecting the gluing devices 14; 38, the quick couplings 40; 41 for connecting the stapling devices 37; 16. The quick couplings 39 to 42 are disposed on a lower frame of the work station 13 as shown in FIG. 4. The drive of the quick couplings 39 to 42, at rpm which correspond to the rpm of the printing cylinder, takes place, for example, via a gear wheel 46 which is in operational connection via further gear wheels, not shown, with a main drive for the cylinders of the folding apparatus. An adjustment of the position of the transverse gluing strip of the transverse gluing devices 14; 38 and the position of the puncture of the staples of the continuous transverse stapling devices 16; 37 on the paper web is respectively possible by means of known linear adjustment devices 27; 36, which can be actuated, for example, by means of a handwheel 47—(FIG. 4)—or an electric motor. The spindle of the handwheel 47 projects through a cover 48.

As shown in FIG. 4, a console 51 is screwed to the exterior of a side frame 49, on which a movable traveling crane 57 with a lifting device 58 with load-suspending tackle is disposed on supports fixed on it. An upper edge of the console 51 is aligned flush with the level of the seating surface of the transverse gluing and continuous transverse stapling devices, in this case the continuous transverse stapling device 37.

Figure 5:
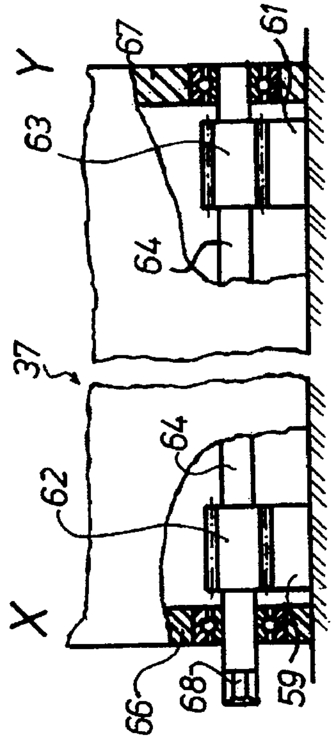

In accordance with the detail X and Y of FIG. 2 illustrated in FIG. 5, toothed rails 59, 61 fixed on the frame of the work station and respectively extending parallel to the paper web strip width and parallel to each other, are provided for moving the devices 14; 16; 37; 38 out. On them the devices 14; 16; 37; 38 are respectively moved in the direction toward the interior of the work station into a work or operating position and back into a standby position on the console 51. A spindle 64, respectively seated in the side frames of the device 14; 16; 37; 38 and driven manually or by a motor is used for this. It has two gear wheels 62; 63, which are interlockingly connected with it and which mesh with the teeth of the toothed rail 59 and 61. The spindles 64 can be driven by an end 68 laterally projecting from the side frame 66 of the device 14; 16; 37; 38 by means of a crank or a drive flanged there, and the devices, for example 37, can be displaced in this way.

In the operating position the devices 14; 16; 37; 38 are respectively fixedly connected by means of screws, for example, with the work station frame.

The devices 14; 16; 37; 38 can be respectively employed in accordance with the technical printing requirements by means of the lifting device 58 of the traveling crane 57. The traveling crane 57 is fastened on the side frames of the work station 13. In addition, the devices 14; 16; 37; 38 have transport eyes.

Respectively one stapling wire feed 60 and one stapling wire supply roll 65 are disposed per connecting possibility 40; 39 for the continuous transverse stapling devices 16; 37. The connections for compressed air, pressure fluid or current are also equipped with quick couplings.

I claim:

1. A convertible folding apparatus for a web-fed rotary printing press comprising:

a folding apparatus frame;

at least a first linear folding device for receipt of partial paper webs, said at least first linear folding device being fixed on said folding apparatus frame;

a work station on said folding apparatus frame and positioned after, in a direction of web travel, said linear folding device, said work station being adapted to interchangeably receive both transverse gluing and continuous transverse stapling devices;

means for feeding linearly folded and not linearly folded partial paper webs from said at least one linear folding device to said work station;

means on said folding apparatus frame for accomplishing said interchangeable reception and operation of both said interchangeable transverse gluing and continuous transverse stapling devices in said work station; and coupling devices secured on said folding apparatus frame and engageable with said transverse gluing device and said continuous transverse stapling device interchangeably received in said work station to connect said interchangeably received transverse gluing device and said continuous transverse stapling device to a main drive for said web-fed rotary printing press.

2. The convertible folding apparatus of claim 1 further including a transverse folding drive and wherein said coupling devices are connected to a gear drive of said transverse folding device.

3. The convertible folding apparatus of claim 1 further including a support console secured to said folding apparatus frame adjacent said work station, said support console being adapted to support said transverse gluing and transverse stapling devices exterior of said work station.

4. The convertible folding apparatus of claim 3 including toothed support rails positioned on said work station and on said support console, and further including driveable gear wheels seated in said transverse gluing and transverse stapling devices, said driveable gear wheels being engageable with said toothed support rails and being operable to move said transverse gluing and stapling devices between said support console and said work station.

5. The convertible folding apparatus of claim 3 further including a traveling crane with a load lifting device disposed above said support console on supports secured to said folding apparatus, said lifting device being engageable with said transverse gluing and stapling devices to move said devices on and off said support console.

* * * * *